US010113704B2

(12) United States Patent
Knittel et al.

(10) Patent No.: US 10,113,704 B2
(45) Date of Patent: Oct. 30, 2018

(54) HEADLIGHT OF A MOTOR VEHICLE WITH LOW CONSTRUCTION DEPTH

(71) Applicant: Automotive Lighting Reutlingen GmbH, Reutlingen (DE)

(72) Inventors: Joachim Knittel, Reutlingen (DE); Martin Licht, Reutlingen (DE); Christian Buchberger, Reutlingen (DE); Emil P. Stefanov, Reutlingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 0 days.

(21) Appl. No.: 15/644,140

(22) Filed: Jul. 7, 2017

(65) Prior Publication Data

US 2018/0010756 A1 Jan. 11, 2018

(30) Foreign Application Priority Data

Jul. 8, 2016 (DE) .................. 10 2016 112 617

(51) Int. Cl.
*B60Q 1/00* (2006.01)
*F21V 11/00* (2015.01)
(Continued)

(52) U.S. Cl.
CPC ............. *F21S 41/25* (2018.01); *F21S 41/125* (2018.01); *F21S 41/143* (2018.01);
(Continued)

(58) Field of Classification Search
CPC ...... F21S 41/125; F21S 41/141; F21S 41/143; F21S 41/151; F21S 41/153; F21S 41/155;
(Continued)

(56) References Cited

U.S. PATENT DOCUMENTS 7,131,758 B2  11/2006  Ishida
2004/0208020 A1  10/2004  Ishida
(Continued)

FOREIGN PATENT DOCUMENTS

DE  102004019318 A1  11/2004
DE  102004035761 A1  3/2005
(Continued)

OTHER PUBLICATIONS

Examination Report issued in German Patent Application No. 10 2016 112 617.9 dated Mar. 23, 2017 (5 pges).
(Continued)

*Primary Examiner* — Jason Moon Han
(74) *Attorney, Agent, or Firm* — Howard & Howard Attorneys PLLC

(57) ABSTRACT

A headlight of a motor vehicle including a light source and first projection optics, in which each one includes a respective first pair made of one respective first image mask and of one respective first projection lens with a first focal length, which is illuminated by the light source through the one respective image mask. The headlight has two projection optics, in which each one is featuring a respective second pair made of one respective second image mask and of one respective second projection lens with a second focal length, which is illuminated by the light source through the one respective second image mask. The second focal length is greater than the first focal length. An illuminated portion of the first image mask, has a shape of at least a first portion of an overall light distribution of the headlight, and a portion of the second image masks, has a shape of a central portion of the overall light distribution of the headlight.

14 Claims, 3 Drawing Sheets

(51) Int. Cl.
*F21S 41/25* (2018.01)
*G02B 27/18* (2006.01)
*F21S 41/143* (2018.01)
*F21S 41/255* (2018.01)
*F21S 41/265* (2018.01)
*F21S 41/43* (2018.01)
*F21S 41/64* (2018.01)
*F21S 41/663* (2018.01)
*F21S 41/37* (2018.01)
*F21S 41/125* (2018.01)

(52) U.S. Cl.
CPC .......... *F21S 41/255* (2018.01); *F21S 41/265* (2018.01); *F21S 41/37* (2018.01); *F21S 41/43* (2018.01); *F21S 41/645* (2018.01); *F21S 41/663* (2018.01); *G02B 27/18* (2013.01)

(58) Field of Classification Search
CPC .. F21S 41/16; F21S 41/18; F21S 41/25; F21S 41/255; F21S 41/265; F21S 41/285; F21S 41/37; F21S 41/43; F21S 41/60; F21S 41/63; F21S 41/645; F21S 41/663; G02B 27/18

USPC ................. 362/520–521, 538–539, 543–545
See application file for complete search history.

(56) References Cited

U.S. PATENT DOCUMENTS

| | | |
|---|---|---|
| 2005/0018443 A1 | 1/2005 | Tsukamoto |
| 2015/0062446 A1 | 3/2015 | Schreiber et al. |
| 2016/0018081 A1 | 1/2016 | Kadoriku et al. |
| 2016/0265733 A1 | 9/2016 | Bauer et al. |

FOREIGN PATENT DOCUMENTS

| | | |
|---|---|---|
| DE | 102004019318 B4 | 1/2010 |
| DE | 102012207621 A1 | 11/2013 |
| WO | 2014164792 A1 | 10/2014 |
| WO | 2015058227 A1 | 4/2015 |

OTHER PUBLICATIONS

Office Communication issued in European Patent Application No. 17175684.4 dated Jan. 9, 2018 (7 pages).

HEADLIGHT OF A MOTOR VEHICLE WITH LOW CONSTRUCTION DEPTH

CROSS-REFERENCE TO RELATED APPLICATIONS

The present application claims priority to and all the benefits of German Patent Application No. 10 2016 112 617.9, filed on Jul. 8, 2016, which is hereby expressly incorporated herein by reference in its entirety.

BACKGROUND OF THE INVENTION

1. Field of the Invention

The present invention relates to a headlight in a motor vehicle.

2. Description of the Related Art

Such a headlight is known from the WO 2015/058227 and features a light source arrangement and a plurality of first projection optics, of which each has a first pair that is made by a first image mask and a first respective projection lens, which is illuminated by the light source arrangement through the one respective image mask and which has a first object-sided focal length, and in which the image mask of each primary pair is positioned within an object-sided focal area of the first projection lens of the respective first pair and whereby one part of the first image mask that is illuminated by the light source arrangement features a form of at least one first portion of an overall light distribution of the headlight, and whereby the first projection lenses are arranged within a first plane and are illuminated by the light source arrangement from same directions.

Conventional LED headlights that produce a light distribution with only one single projection optic feature an undesirably deep headlight construction depth ranging from 20 cm to 30 cm, caused by the focal length of the projection lens of about 10 cm.

There is a need for efficient headlights that feature a lower construction depth, and where the construction allows the generation of a predetermined intensity profile. Such an intensity profile features e.g. a light-dark boundary and/or a central spot that is significantly brighter than the adjacent area of the remaining light distribution.

Although a simple reduction of the focal length of the projection lens could reduce the construction depth, it would also increase the light distribution that is resulting from the projection to an unacceptable extent, since a reduction of the focal length would lead to an increase of the magnification factor. A solution to possibly limit the light distribution by means of apertures would reduce the efficiency of the headlight to an undesired degree.

They initially mentioned WO 2015/058227 explains that the resulting reduction of the focal length and measurements of the individual projection optics due to the use of a plurality of projection optics leads to a good efficiency, while a reduction of the focal length of a conventional projection optic, whose measurements remain essentially unchanged, does allow for a reduction of the construction depth, but also leads to a deterioration of the efficiency factor.

With reference to the generation of a predetermined intensity distribution, it is proposed in accordance with FIG. 3 of the WO 2015/058227, to superimpose images from a plurality of micro apertures of the projection optics that differ in their form to an overall light distribution.

The DE 10 2012 207 621 A1 shows a projection display that is equipped with an image generator which produces individual images in a distribution of partial areas of an imaging plane of the image generator. The projection display also includes a multi-channel lens or a multiple aperture arrangement which projects a partial area of the image generator that is assigned to each respective channel, in such a way that the depictions of the individual images fit together to one overall image in a projection area. The joining together of the depictions of the individual images is supposed to be an overlapping, a tiled arrangement or a partial overlapping of the depictions of the individual images. The multiple aperture arrangement is to ensure a short projection optic due to short focal lengths within the individual channels. At the same time, a planar arrangement of the apertures is to ensure the transmitting of a large luminous flux. With reference to the achieving of a predetermined intensity distribution, this document proposes pre-defined grey level courses of the image generator or an image generator that features liquid crystal elements or digital mirror devices. Depending on the used technology, these image generator elements are shone through by the light used for the projection, or reflect parts of this light. One advantage of the subject-matter of this document is supposed to be found in combining a large range of focal depth with a relatively high projection brightness, which is achieved without any loss with regards to the sharp representation of projected image features.

The techniques proposed in the DE 10 2012 207 621 A1 for the achieving of a predetermined intensity distribution have in common, that they produce a desired light distribution in that they subtract portions from a possible maximum luminous flux by absorbing these portions or by deflecting them out of the luminous flux that is contributing to the light distribution. In both cases, this is accomplished at the expense of a desired high efficiency. As a conceivable application, this document mentions, along with many other examples, the use of the projection displays in front headlights, but does not provide further details.

The DE 10 2004 019 318 B4 shows a headlight for producing a light distribution which features various light output units, which comprise a respective projector lens, whereby two types of projector lenses differ in their focal length. The lenses with the larger focal length produce spot-like light distributions that are narrower than light distributions that are generated by the lenses with the shorter focal length.

The DE 10 2004 035 761 A1 also presents a headlight that features different illumination units which comprise a respective projection lens, whereby two kinds of projection lenses differ in their focal length. The lenses with the greater focal length produce spot-like light distributions, which are narrower than light distributions that were produced by means of lenses with the shorter focal length. The illumination units feature plate-shaped apertures without openings, whose aperture edge is depicted as light-dark boundary.

SUMMARY OF THE INVENTION

It is the objective of the invention to specify a headlight of a motor vehicle that produces a desired intensity distribution and which is even more efficient than the headlight that is known from the before-mentioned WO 2015/058227.

This objective is accomplished in a headlight of a motor vehicle including a light source arrangement and a plurality of first projection lenses, of which each has a first pair that is made by a first image mask and a first respective projection lens, which is illuminated by the light source arrangement through the one respective image mask and which has a respective first object-sided focal length (f1). The image mask of each first pair is positioned within an object-sided focal area of the first projection lens of the respective first pair. One part of the first image mask that is illuminated by the light source arrangement features a form of at least one first portion of an overall light distribution of the headlight. The first projection lenses are arranged within a first projection lens plane and are illuminated by the light source arrangement from same directions. The first object-sided focal lengths (f1) are identical for the first projection lenses. The headlight includes a plurality of second projection lenses, of which each has a second pair that is made by a second image mask and a second respective projection lens, which is illuminated by the light source arrangement through the one respective second image mask and which has a respective second object-sided focal length (f2), which is greater than the first focal length (f1), and in which the image mask of each second pair is positioned within an object-sided focal area of the second projection lens of the respective second pair. One part of the second image mask that is illuminated by the light source arrangement features a form of an inner, central portion of the overall light distribution of the headlight, and the second projection lenses are arranged within a second projection lens plane and are illuminated by the light source arrangement from same directions.

Due to the fact that the projection lenses are illuminated through the image masks from same directions, the images are also projected in the same direction. As a result, the projected images of the primary image masks superimpose to one light distribution in the distant field, which has the shape and size of the desired overall light distribution. Since the first object-sided focal lengths for the first projection lenses are identical, the illuminated structures of the first image masks are magnified with the same Magnification factor.

Since the second focal length is greater than the first focal length, the images of the second image masks are smaller than the images of the first image masks, so that the second projection optics illuminate a smaller area of the overall light distribution than the first projection optics. As a result, a greater brightness or illumination intensity is obtained in the smaller area compared to the remaining area of the overall light distribution. A plurality of images from the illuminated portion of the second image masks are generated and superposed to a bright center in a central area of the overall light distribution, which results, in conjunction with the remaining light distribution by the projection of portions of the first image mask, in a desired overall light distribution that is featuring a bright center.

One embodiment is distinguished by the fact that the first image masks are identical to one another and that the first pairs of first image masks and first projection lenses are arranged in such a way that the first image masks are arranged within a first image mask plane and the first projection lenses are arranged within a first projection lens plane, which is parallel to the first image mask plane, and that openings of the first image masks are located within the first image mask plane and that the first projection lenses are arranged in the same orientation with regards to the other. As a result, the projected images of the first image masks exactly overlap in the distant field without any lateral offset towards each other.

In one embodiment, the second image masks are identical to one another and that the second pairs of second image masks and the second projection lenses are arranged in such a way that the second image masks are arranged within a second image mask plane and the second projection lenses are arranged within a second projection lens plane that is parallel to the second image mask plane, and that openings of the second image masks are located in the second image mask plane and that the second projection lenses are arranged in the same alignment with regards to one another. By means of this arrangement and alignment, it is possible that the projected images of the second image masks are exactly overlapping in the distant field without any lateral offset.

In one embodiment, the second image masks are not identical to one another and that the second pairs of second image masks and of second projection lenses are arranged in such a way that the projected images of the second image masks are of different sizes in the distant field and that they superimpose with the other in an overlapping manner.

Another embodiment has a common light source and illumination optics for the illumination of the first masks and of the second masks.

In still another embodiment, the headlight comprises a light source field, whose light sources are switchable, either individually or as a group, in order to illuminate a single image mask or a group of image masks.

In still another embodiment, the first image masks are identical with regards to one another and that the first pairs of first image masks and of first projection lenses are arranged in such a way, that the projected images of the first image masks are exactly overlapping in the distant field without any lateral offset to each other and that the headlight has a light source emitting a red light, a light source emitting a green light and a light source emitting a blue light, whereby the light sources emitting the red light illuminates a first portion of the first masks and the light source emitting the green light illuminates a second portion of the first masks and the light source emitting the blue light illuminates a third portion of the first masks.

The focal lengths of the first projection lenses and of the second projection lenses range between 1 mm and 10 mm.

In one embodiment, the large focal length is larger than the small focal length by a factor of 2 to 5.

Each projection lens may have a diameter ranging between 2 mm and 3 mm.

The sum of the light output areas of the first projection lenses and of the second projection lens may range between 20 $cm^2$ and 30 $cm^2$.

In one embodiment, the image masks are made of a transparent material that is coated with a reflective metal or absorbent material.

The masks may include grayscale masks that are produced by grayscale lithography.

In one embodiment, the masks are made by liquid crystal matrix elements with controllable transmission or reflection degrees.

It is understood that the characteristics that were mentioned above and those that will still be explained in the following can be used, not only in the respectively mentioned combination, but also in other combinations or individually, without leaving the scope of the present invention.

BRIEF DESCRIPTION OF THE DRAWINGS

Embodiments of the invention are depicted in the drawings and will be explained in more detail in the following description. The same reference signs in various figures will hereby refer to elements that are equal in their respective case, or at least comparable according to their function.

DETAILED DESCRIPTION OF THE INVENTION

Figure 1:
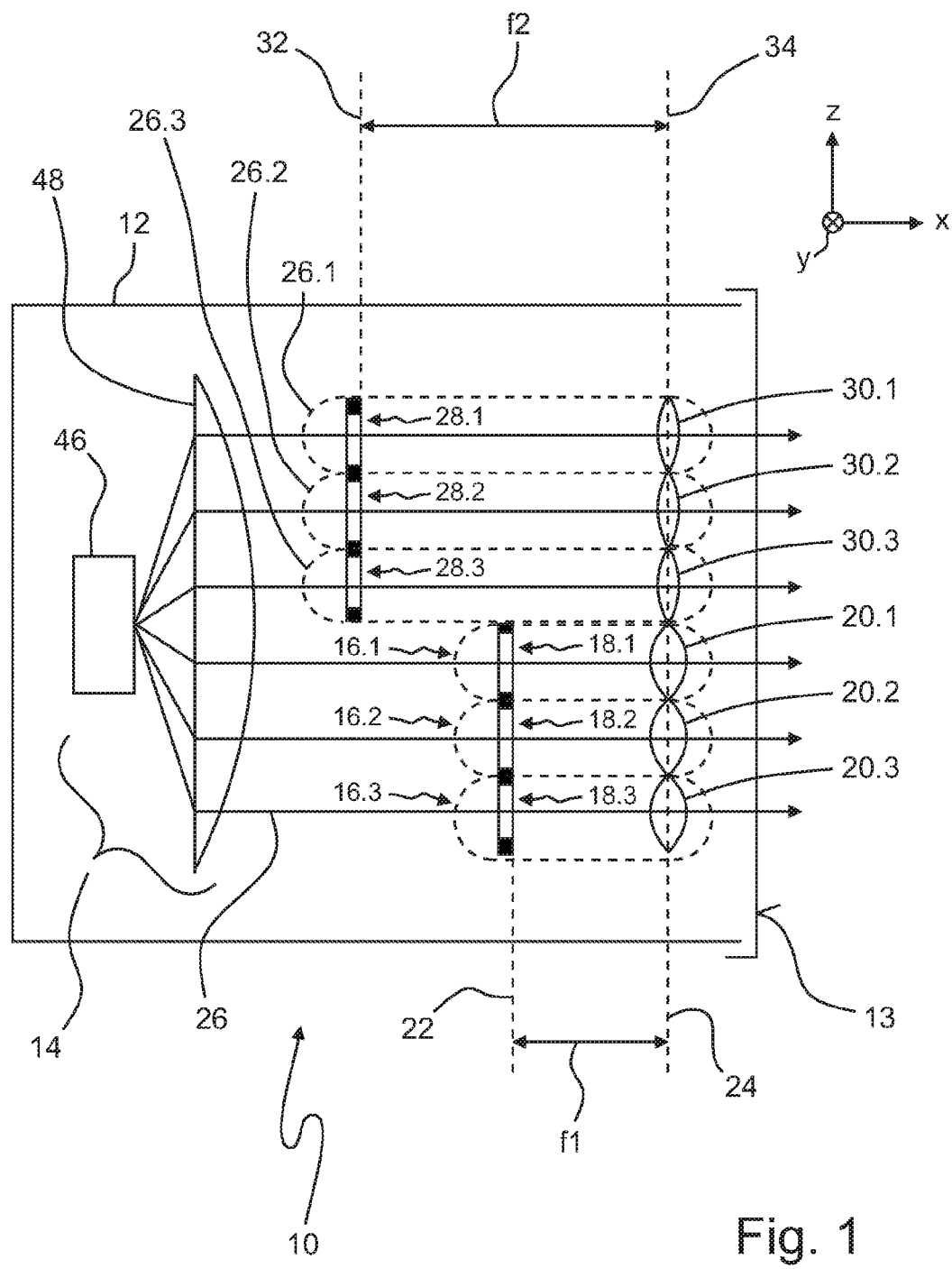
FIG. 1 shows a first embodiment of a headlight of a motor vehicle according to the invention.

In detail, FIG. 1 shows a section through a headlight of a motor vehicle 10. When the headlight is used according to the intended purpose in a motor vehicle, the mentioned x-direction corresponds to the forward driving direction and thus to the direction of a longitudinal axis of the vehicle. The y-direction is parallel to a transverse axis of the motor vehicle, and the z-direction is parallel to a vertical axis of the vehicle. The depicted section in FIG. 1 thus refers to a vertical section that is parallel to the longitudinal axis of the vehicle.

The headlight of the motor vehicle 10 features a housing 12, whose light aperture is covered by a transparent cover screen 13. The interior of the housing 12 is equipped with a light source arrangement 14 and a plurality n of first projection optics 16.1, 16.2, 16.3. In the illustrated example, n=3. In a possible implementation, this number n will likely range between 150 and 500.

Each projection optic 16.i with i equaling from 1 to n, comprises a first pair made of a respective first image mask 18.i and of a first respective projection lens 20.i, which is illuminated by the light source arrangement 14 through one respective image mask 18.i and which features a first object-sided focal length f1.

Each image mask 18.1 of each first pair, or each first projection optic 16.i is positioned within one object-sided focal area 22 of the first projection lens 20.1 of the respective first pair.

The first projection lenses 18.i are arranged within a first projection lens plane 24 and are illuminated by the light source arrangement 14 from same directions 26. The first object-sided focal lengths f1 are identical for the first projection lenses 20.i.

Due to the illumination from the same direction, the images of the image masks 18.i that are projected into the distant field, that is located a few meters in front of the headlight 10, are positioned in an overlapping manner and thus superimpose to one resulting light distribution.

In addition to this, headlight 10 features a plurality of second projection optics 26.i with i=1 to n. Each one of these second projection optics 26.i comprises a second pair made up of a second respective image mask 28.i and a second respective projection lens 30.1. Every second projection lens 30.i is illuminated by the light source arrangement 14 through its corresponding second image mask 28.1.

Each second projection lens 30.i features a second object-sided focal length f2, which is greater than the first focal length f1. Since the second focal length f2 is greater than the first focal length f1, a magnification is resulting for the second projection optics 26.i, which is smaller than the magnification that is achieved by the first projection optics 16.1.

Every second image mask 28.i of each second pair is hereby situated within an object-sided focal area 32 of the second projection lens 30.i of the second pair, or of the second projection optics 26.i, respectively.

The second projection lenses 30.1 are arranged within a second projection lens plane 34 and are illuminated from same directions 26 by the light source arrangement 14.

The first pairs or projection optics from the first image masks and from the first projection lenses, as depicted in FIG. 1, are arranged in such a way, that the first image masks 18.i are arranged within a first image mask plane, which is parallel to the first projection lens plane, so that the openings of the first image masks are situated within the first image mask plane. The first projection lenses are furthermore arranged with the same orientation with reference to one another.

The second pairs or projection optics from the second image masks and from the second projection lenses, as depicted in FIG. 1, are arranged in such a way, that the second image masks 18.i are arranged within a second image mask plane, which is parallel to the second projection lens plane, so that the openings of the second image masks are situated within the second image mask plane. The second projection lenses are furthermore arranged with the same orientation with reference to one another.

The object-sided focal lengths f1, f2 of the projection lenses preferably range between 1 mm and 10 mm, whereby the larger focal length f2 is greater than the smaller focal length f1, preferably by a factor of 2 to 5.

Each one of the projection lenses has a preferred diameter that ranges between 2 mm and 3 mm. It is also preferred that the sum of the light output areas of the first projection lenses and of the second projection lenses range between 20 $cm^2$ and 30 $cm^2$. As a result, the sum of the projection optics ranges between approximately 300 and 1000, so that n is preferably situated between 150 and 500. In a preferred embodiment, the projection lenses are arranged adjacent to each other.

Figure 2:
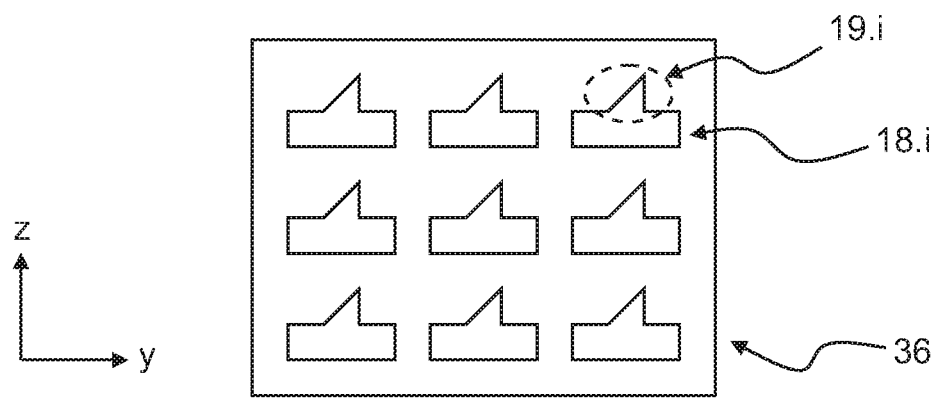
FIG. 2 shows an illustration of a first image mask field.

FIG. 2 depicts an image mask field 36 of first image masks 18.i in a plane that is parallel to the y-z-plane and thus perpendicular to the main beam direction x. Each first image mask 18.i features a portion 19.i of the first image mask 18.i that is illuminated by the light source arrangement, which has a shape of at least a first portion of an overall light distribution of the headlight. In the depicted example, this first portion is a portion of a low beam light distribution featuring a light dark boundary. The first image masks 18.i of the first image mask field 36 are identical in the depicted example.

Figure 3:
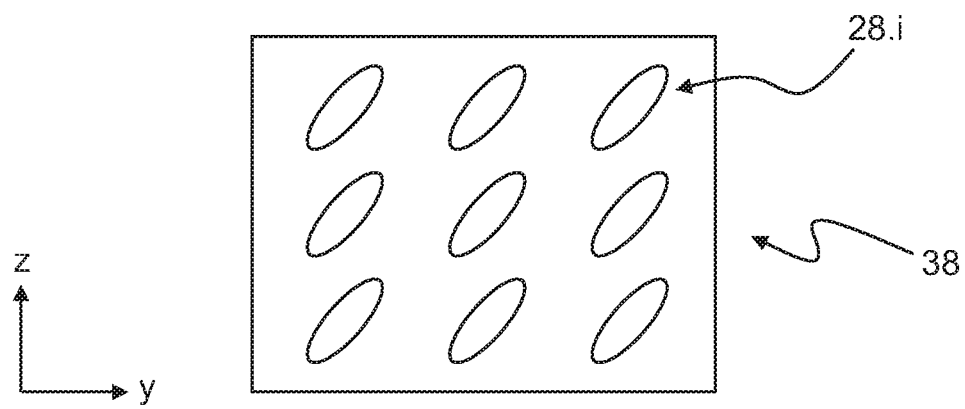
FIG. 3 shows an illustration of a second image mask field.

FIG. 3 depicts an image mask field 38 of second image masks 28.i in a plane that is parallel to the y-z-plane and thus perpendicular to the main beam direction x. Each second image mask 28.i features a portion of the second image mask 28.i that is illuminated by the light source arrangement 14, which has a shape of at least a second portion of an overall light distribution of the headlight.

The second image masks 28.i of the second image mask field 38 are identical in the depicted example.

In the depicted example, the second portion of the overall light distribution has a shape of a central part of the overall light distribution of the headlight. The depicted example refers to a bright spot, which illuminates e.g. the center of a low beam light distribution more intensely.

Figure 4:
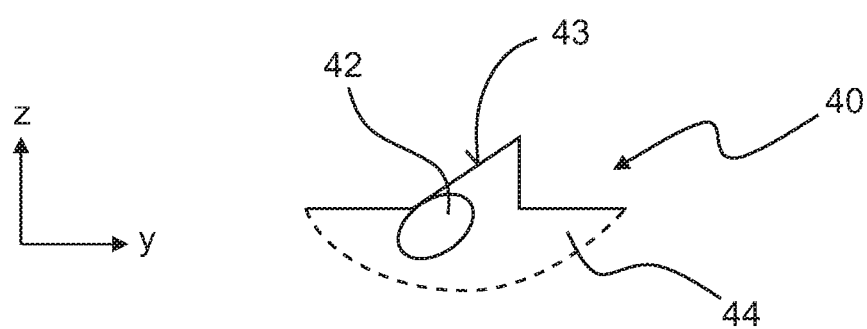
FIG. 4 shows a light distribution that was generated by the headlight of the motor vehicle of FIG. 1 by the image masks of the FIGS. 2 and 3.

FIG. 4 depicts an overall light distribution 40, as it is generated due to an overlapping of the projected images in the distant field, i.e. a few meters in front of the motor vehicle, within a plane that is parallel to the y-z-plane and thus perpendicular to the main beam direction x. The bright spot 42 is the sum of the portions of the first image masks 18.1 positioned in this area and the sum of the images of the second image masks 28.1. The area 44 of the overall light distribution 40 that is surrounding the bright spot 42, which is featuring a light dark boundary 42, is the sum of the contributions of the images of the illuminated areas 19.$i$ of the first image masks 18.1

In the same distance from the headlight, the bright spot 42 has a smaller area than the images projected by the first projection lenses 44 of the illuminated areas 19.$i$ of the first image masks. This is primarily due to the different magnification, which is less for the second projection optics 28.$i$ than for the first projection optics 16.$i$. The different magnification is a consequence of the different focal lengths, which is greater at the second projection optics than at the first projection optics.

In another embodiment, the second image masks are not identical to each other and particularly feature differently sized openings. The second pairs of second image masks and second projection lenses are hereby arranged in the same manner as in the previously described embodiment. In this different embodiment, the projected images of the second image masks have different sizes in the distant field and overlap as well. Due to their different sizes, they are no longer positioned congruently on top of each other, but rather within each other. With this embodiment, it is possible to generate a brightness of the central spot which is particularly decreasing from the inside towards the outside, which produces a less abrupt transition from the bright spot 42 to the remainder 44 of the overall light distribution 40. Also in the area of the light dark boundary, i.e. where the spot comes close to the light dark boundary of the overall light distribution, the spot can feature a straight line as boundary, so that the edges in this area, which means the light dark boundaries of both masks 18.$i$, 28.$i$, lie on top of each other. The limiting straight line is either located in the horizontal section or in the sloping section of the light dark boundary, or there is one respective straight line in the horizontal section and one straight line in the sloping section of the light dark boundary.

It applies for both, the first image masks 18.1, as well as for the second image masks 28.$i$, that these image masks in one embodiment can be made of a transparent material that is partially coated with reflective metal or absorbent material. The uncoated parts make up the translucent openings of the image masks. In an alternative embodiment, the image masks are greyscale masks that are produced by greyscale lithography. In another alternative embodiment, the image masks are made by liquid crystal matrix elements with controllable transmission or reflection degrees.

The embodiments described thus far, feature a light source arrangement 14, as it is depicted in FIG. 1. There, the light source arrangement 14 is made up of one individual light source 46 and one lighting optics 48 that bundles the light of the individual light source and which aligns the bundled light in parallel direction and illuminates the image mask fields 36, 38 of the projection optics 16.$i$, 26.$i$ with this parallel light.

The single light source 46 may be one individual semiconductor light source that is emitting white light or a group of semiconductor light sources that can be switched on and off together. The semiconductor light sources primarily refer to e.g. light emitting diodes or laser diodes that emit light or laser rays from the blue or ultraviolet spectral range, which initially produce fluorescent light by a fluorescent pigment and then white mixing light from it. Such semiconductor light sources are known from the standard-production use for automobile headlights.

Figure 5:
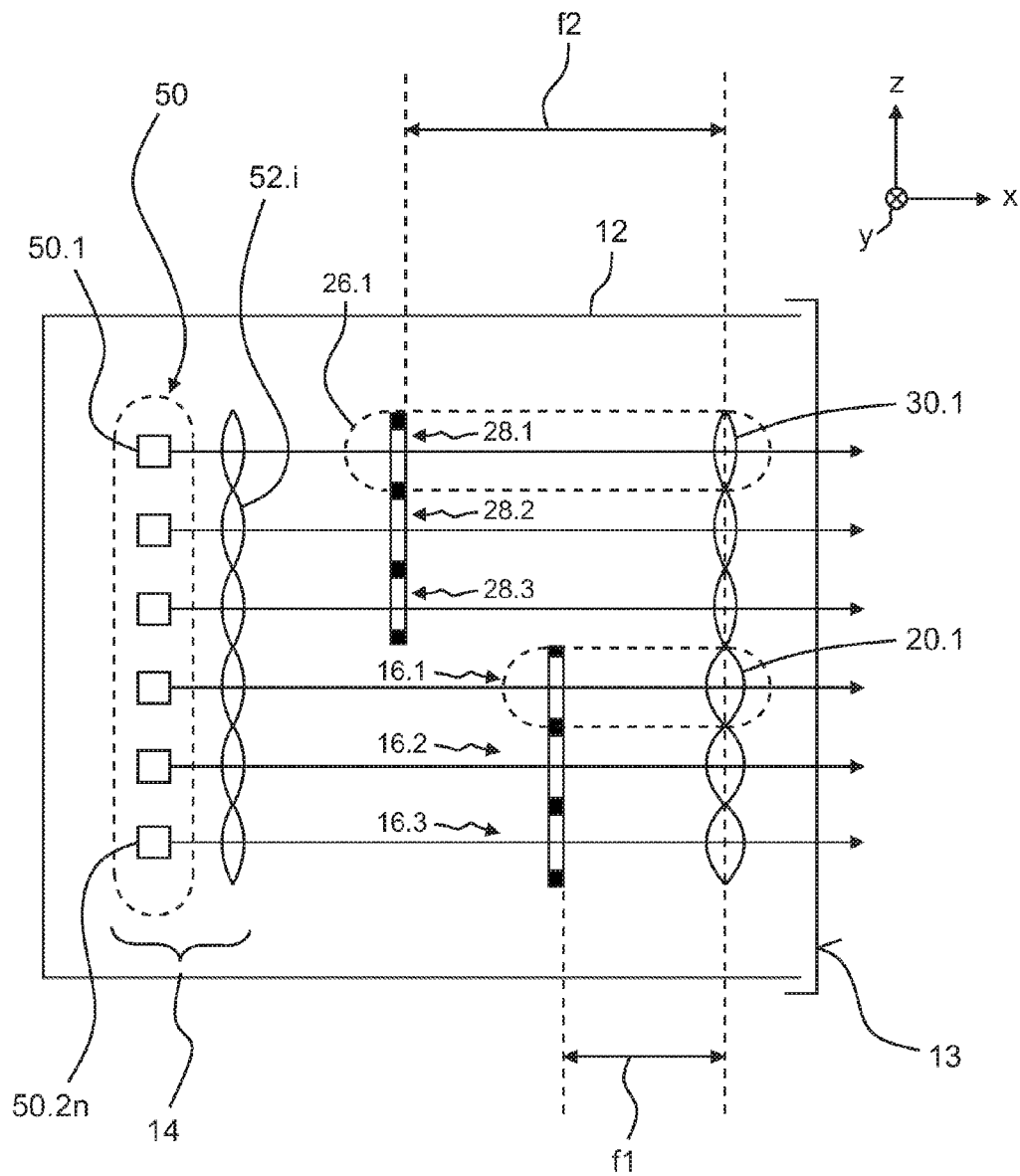
FIG. 5 shows a second embodiment of a headlight of a motor vehicle according to the invention.

FIG. 5 depicts an embodiment, in which, instead of one single light source, a field of individual light sources 50.$i$ with i=1 to 2 n is used to illuminate the image masks. The individual light sources 50.1 may include semiconductor light sources of the above-mentioned type, i.e. white mixing light emitting light emitting diodes or laser diodes. Is preferred that one corresponding individual light source 50.$i$ is prepared for each projection optic 16.$i$, 28.$i$, which can be controlled individually.

Thus, FIG. 5 depicts an embodiment that has a light source field 50, in which the light sources 50.$i$ can be switched individually or as a group and which illuminates an individual image mask or a group of image masks. Each light source 50.$i$ illuminates one lighting optics portion 52.$j$ with j=1 to 2n, which, in turn, illuminates an associated image mask 16.$i$, 28.$i$. Such an embodiment allows for more possibilities for the generation of different light distributions, since the switching on of each individual light source or of each individual group of light sources also generates a fraction of an intensity (brightness) of the light distribution.

The number of possibilities for generating different light distributions can even be increased, if various image masks are used within one image mask field, be it the first image mask field or the second image mask field or also within the first and the second image mask field. By switching individual light sources or groups of light sources on and off, it is possible to connect or disconnect contributions of the various image masks. It is therefore e.g. possible to generate rather wide light distributions for city traffic and rather narrow light distributions for high speeds, by switching on light sources of wide opened image masks for the wide light distributions and by switching these off at higher speeds.

In a further embodiment, the number n of the respective projection optics can be divided by 3 and the headlight comprises one light source emitting red light, one light source emitting green light and one light source emitting blue light. The light source or group of light sources emitting red light is thereby arranged in such a way that it illuminates a first portion of the first masks. In the same way, the light source or group of light sources emitting green light is arranged in such a way that it illuminates a second portion of the first masks, and the light source or group of light sources emitting blue light is arranged in such a way that it illuminates a third portion of the first masks.

In this embodiment, the first image masks are identical to each other, and the first pairs of first image masks and first projection lenses are arranged in such a way that the projected images of the first image masks are positioned exactly on top of the other in the distant field without any lateral offset to each other. The overlaying of the images results in a white mixing light as well, as it is required for headlights in motor vehicles. Depending on the light function (for example, high beam light) it is still possible to place diffuser elements in front of the lenses 20, 30, preferably with a horizontal diffusion.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A headlight of a motor vehicle comprising: a light source arrangement and a plurality of first projection optics, of which each has a first pair that is made by a first image mask and a first respective projection lens, which is illuminated by the light source arrangement through the one respective image mask and which has a respective first object-sided focal length (f1), and in which the image mask of each first pair is positioned within an object-sided focal area of the first projection lens of the respective first pair and whereby one part of the first image mask that is illuminated by the light source arrangement features a form of at least one first portion of an overall light distribution of the headlight, and whereby the first projection lenses are arranged within a first projection lens plane and are illuminated by the light source arrangement from same directions, wherein the first object-sided focal lengths (f1) are identical for the first projection lenses and that the headlight includes a plurality of second projection optics, of which each has a second pair that is made by a second image mask and a second respective projection lens, which is illuminated by the light source arrangement through the one respective second image mask and which has a respective second object-sided focal length (f2), which is greater than the first focal length (f1), and in which the image mask of each second pair is positioned within an object-sided focal area of the second projection lens of the respective second pair and whereby one part of the second image mask that is illuminated by the light source arrangement features a form of an inner, central portion of the overall light distribution of the headlight, and whereby the second projection lenses are arranged within a second projection lens plane and are illuminated by the light source arrangement from same directions.

2. The headlight as set forth in claim 1, wherein the first image masks are identical to one another and that the first pairs of first image masks and first projection lenses are arranged in such a way that the first image masks are arranged within a first image mask plane, which is parallel to the first projection lens plane and that openings of the first image masks are located within the first image mask plane and that the first projection lenses are arranged in the same orientation with regards to the other.

3. The headlight as set forth in claim 1, wherein the second image masks are identical to one another and that the first pairs of second image masks and second projection lenses are arranged in such a way that the second image masks are arranged within a second image mask plane, which is parallel to the second projection lens plane and that openings of the second image masks are located within the second image mask plane and that the second projection lenses are arranged in the same orientation with regards to one another.

4. The headlight as set forth in claim 1, wherein the second image masks are not identical to one another and that the second pairs of second image masks and of second projection lenses are arranged in such a way that the projected images of the second image masks are of different sizes in the distant field and that they overlap into one another.

5. The headlight as set forth in claim 1, further including a common light source and illumination optics for the illumination of the first image masks and of the second image masks.

6. The headlight as set forth in claim 1, further including a light source field, whose light sources are switchable either individually or as a group to illuminate a single image mask or a group of image masks.

7. The headlight as set forth in claim 6, wherein the first image masks are identical with regards to one another and that the first pairs of first image masks and of first projection lenses are arranged in such a way, that the projected images of the first image masks are exactly overlapping in the distant field without any lateral offset to each other and that the headlight has a light source emitting a red light, a light source emitting a green light and a light source emitting a blue light, whereby the light sources emitting the red light illuminates a first portion of the first image masks and the light source emitting the green light illuminates a second portion of the first image masks and the light source emitting the blue light illuminates a third portion of the first masks.

8. The headlight as set forth in claim 1, wherein the focal length of the projection lenses ranges between 1 mm and 10 mm.

9. The headlight as set forth in claim 1, wherein the greater one of the two focal lengths (f1, f2) is greater than the smaller one of the two focal lengths (f1, f2) by a factor ranging from 2 to 5.

10. The headlight as set forth in claim 1, wherein each projection lens has a diameter ranging between 2 mm and 3 mm.

11. The headlight as set forth in claim 1, wherein the sum of the light output areas of the first projection lenses and the second projection lenses ranges between 20 cm$^2$ and 30 cm$^2$.

12. The headlight as set forth in claim 1, wherein the image masks are made of a transparent material that is coated with a reflective metal or absorbent material.

13. The headlight as set forth in claim 1, wherein the image masks are greyscale masks that are produced by greyscale lithography.

14. The headlight as set forth in claim 1, wherein the image masks are made by liquid crystal matrix elements with controllable transmission or reflection degrees.

* * * * *